THOMAS J. JOHNSON, JR.
INVENTOR.

BY
ATTORNEY

THOMAS J. JOHNSON, JR.
INVENTOR.

BY
ATTORNEY

March 21, 1961 T. J. JOHNSON, JR 2,976,521
PERIODIC REFERENCE SIGNAL MODULATION METHOD AND APPARATUS
FOR REPRESENTING THE POSITION OF A DEVICE
Filed Feb. 17, 1955 4 Sheets-Sheet 3
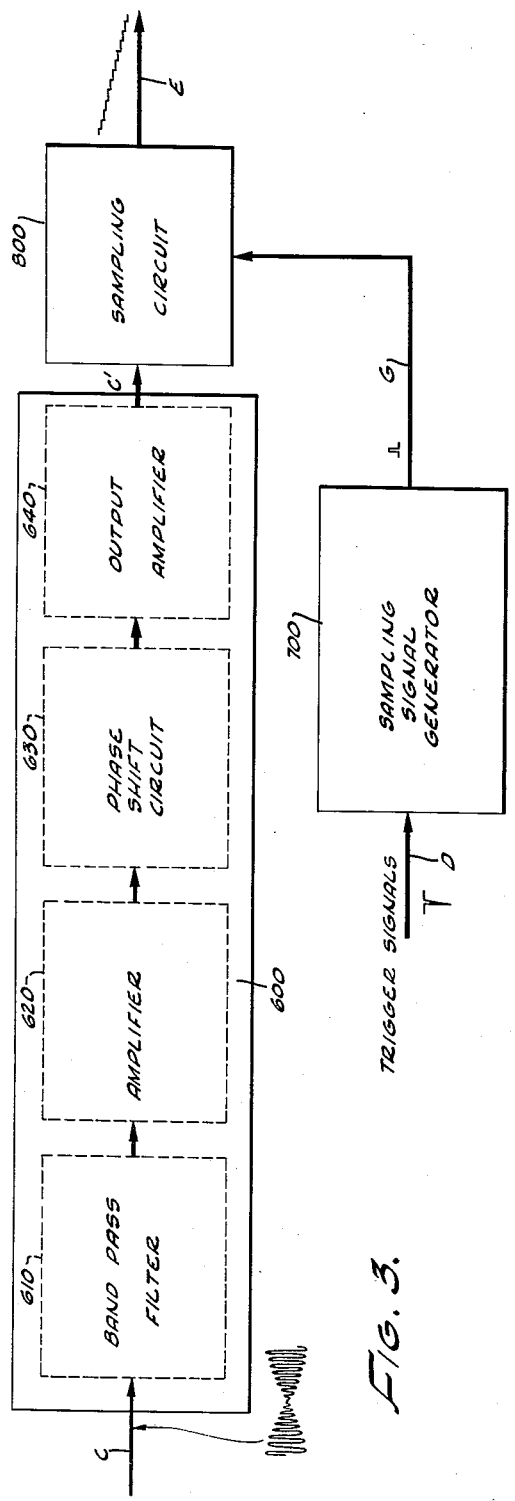
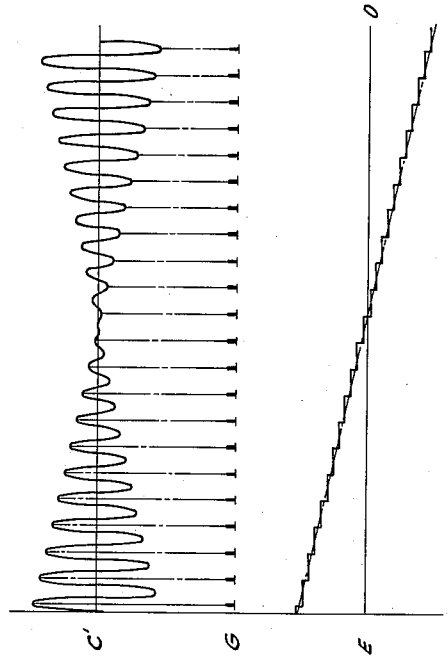
THOMAS J. JOHNSON, JR.
INVENTOR.
BY
ATTORNEY

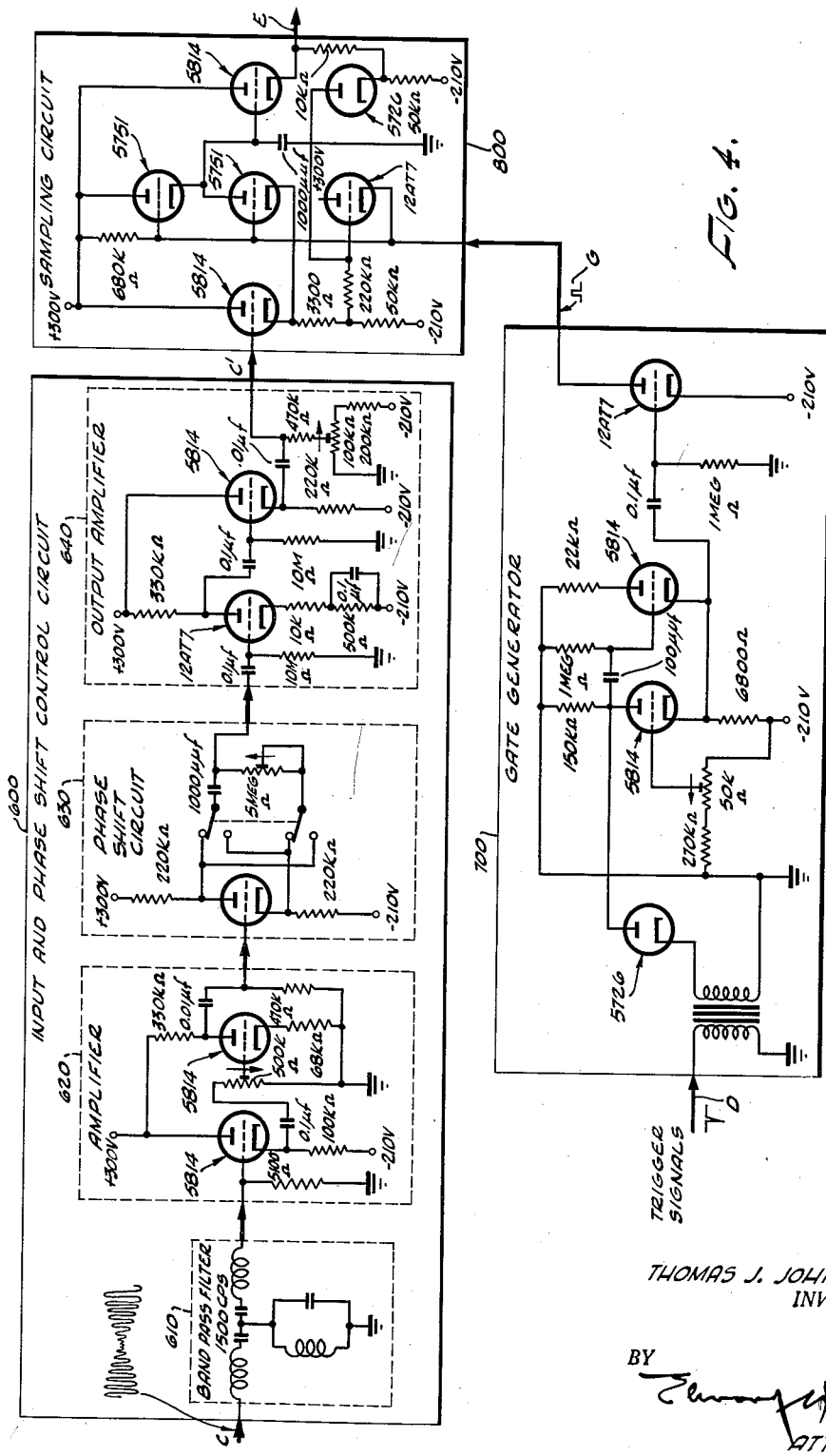

United States Patent Office 2,976,521
Patented Mar. 21, 1961

2,976,521

PERIODIC REFERENCE SIGNAL MODULATION METHOD AND APPARATUS FOR REPRESENTING THE POSITION OF A DEVICE

Thomas J. Johnson, Jr., Los Angeles, Calif., assignor to Gilfillan Bros. Inc., Los Angeles, Calif., a corporation of California Filed Feb. 17, 1955, Ser. No. 488,795

14 Claims. (Cl. 340—196)

This invention relates generally to a method and means for representing the variable position of a device, such as a radar antenna, in terms of a modulated periodic reference signal having a relatively high periodicity with respect to the rate of motion of the device; and specifically to an encoding method and means for representing the position of the device as a data signal where the data signal is a periodic signal having amplitudes during predetermined times of respective periods corresponding to the instantaneous position of the device at that time, each time of signal representation during a period being indicated by the occurrence of a marking or sampling pulse which may be a radar trigger signal; and/or a method and apparatus for decoding a data signal of this type.

The invention may find application where a position-representing data signal must be transferred to a remote location; and, in particular, where angular positional data concerning a radar antenna is to be translated into signals which may be transmitted or otherwise transferred to a remote station for utilization. In a specific situation the antenna data may be utilized in a ground-controlled approach (G.C.A.) system to control the display of certain target information.

The problems inherent in remotely transmitting position-representing signals, such as those representing the angular orientation of an antenna beam, are discussed in my United States Patent No. 2,689,952 for "System for Remotely Transferring Voltages as a Measure of Antenna Beam Scanning in Radar Apparatus," issued September 21, 1954, also assigned to the present assignee. In this patent a technique is introduced for translating antenna voltages into pairs of pulses spaced by amounts representing corresponding voltage values. The invention covered in this patent provides an efficient solution to the data transmission problem where antenna position voltages are available which must be remotely transferred to another location.

The present invention provides another solution to the positional data representing problem and has the particular feature of allowing the encoding of the position of a device directly as the modulation component of a synchronizing signal without the necessity of first producing position-representing voltages as in the above-mentioned patent.

According to the present invention the device which is to have its position represented by a corresponding data signal is coupled to resolver means also receiving a relatively high frequency synchronizing signal to be modulated. The motion of the device is then translated into corresponding change in synchronizing signal envelope amplitude through the resolver means so that the instantaneous amplitude of the modulated synchronizing signal, sampled at a particular time during each period represents the position of the device. Pulses representing the sampling time may be derived from the synchronizing signal and may also be utilized as radar trigger signals. The modulated synchronizing signal and sampling pulses which may also be referred to herein as marking pulses or trigger signals, are then transmitted to the utilizing station, which may be located at a remote point. The positional data thus encoded is translated at the receiving location by sampling the instantaneous modulated amplitude of the synchronizing signal upon each occurrence of a sampling signal, thereby producing an output signal having an amplitude representing the variable position of the device.

Although the invention is not necessarily so limited, it is particularly useful in encoding and/or decoding the angular position of devices such as radar antennas. In this utilization the resolver means effectively provides a vector signal corresponding to the synchronizing or reference signal to be modulated and includes an output circuit which is rotated with the antenna. The output circuit then produces a modulated synchronizing signal corresponding to the sine of the vector signal. If a linear variation in data signal is desired, the coupling between the resolving means and the antenna is selected so that the angular motion of the resolving means is small, and the sine variation of the vector signal is approximately linear.

An important feature of the invention is the simple and efficient method of sign encoding and decoding which is available thereby. The resolving means may be operated through a zero vector coupling point so that the change in sign of the device's position about a reference line results in a change in phase of the modulated reference signal. This change in phase is then decoded into a corresponding negative amplitude signal at the receiving station through the utilization of the sampling signals which always occur at the same point in respective periods of the modulated reference signal. Thus a change in phase in the modulated reference signal results in the coincidence of sampling signal occurring at this point with a signal portion of negative value.

This method of sign encoding allows an increased range of accurate encoding and decoding over the technique of the above-mentioned patent where sign information must be included in the absolute value of the data signal which is transferred. Thus by phase encoding the sign the same amplitude range may be utilized to represent either positive or negative positions with equal accuracy.

Accordinngly, it is an object of the present invention to provide a method for representing positional data as corresponding signals where it is not necessary to first translate the data into corresponding voltages.

Another object of the invention is to provide a method and means for encoding position information where a direct translation into a modulated periodic synchronizing signal is effected, the resulting signal accurately representing both amplitude and sign of the position.

A further object is to provide a simple and efficient method and/or means for position data encoding where the data is directly resolved into a modulated synchronizing or reference signal bearing the desired information without the necessity of intermediate position-to-signal conversion means.

Yet another object is to provide a simple and accurate method and/or means for position data decoding where the data is represented as a modulated synchronizing signal and a corresponding sampling signal of the same frequency is available.

Still another object is to provide an improved method and/or means for transferring position representing data from one location to another remote therefrom.

A specific object of the invention is to provide a system for transferring angular position data to a remote location where it is to be translated into a signal having an amplitude and sign corresponding to the angular position, the system including means for directly resolving the angular position into a corresponding modulated sinusoid and for sampling the modulated sinusoid at a particular time during each period of the sinusoid when its amplitude represents the angular position data.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Fig. 3 is a block diagram of a decoding device utilizing the periodic reference signal sampling method of the invention for producing an output signal which varies in accordance with the position of a device;

Fig. 3a is a composite set of waveforms which occur in the embodiment of Fig. 3 during a typical operation; and Fig. 4 is a schematic diagram of a specific form which the embodiment of Fig. 3 may assume.

Figure 1:
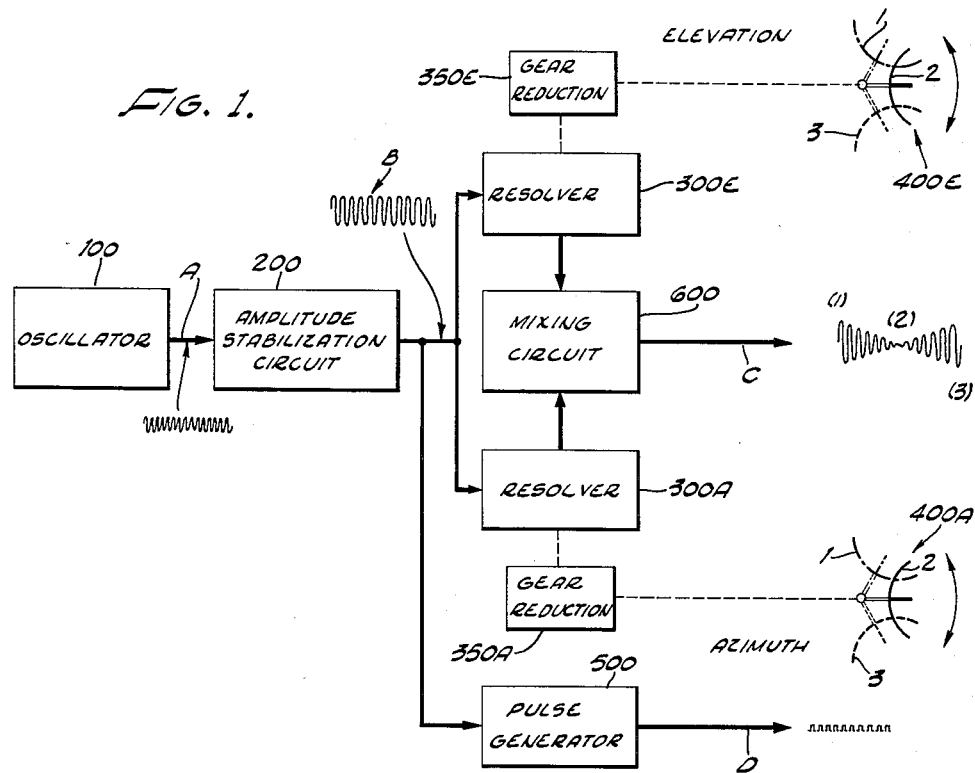
Fig. 1 is a block diagram of an encoding device utilizing the signal modulation method of the invention.

Reference is now made to Fig. 1 where a typical form of encoding circuit is shown for practicing the signal modulation method of the invention. In the embodiment of Fig. 1 an oscillator 100 provides a periodic signal A of a predetermined frequency, the frequency being relatively high with respect to the rate of motion of the device whose position is to be represented. Signal A is then applied to an amplitude stabilization circuit 200 which produces a periodic reference signal B having the same frequency as signal A and an accurately stabilized amplitude which is necessary to ensure that the modulation to be effected thereafter may accurately represent the position of the device.

The periodic reference signal B is then applied to resolving means 300 (including resolvers 300E and 300A) which are coupled through appropriate gear reduction devices 350E and 350A to elevation and azimuth antennas 400E and 400A, respectively. The movement of antennas 400 is then utilized to modulate the amplitude of applied signal B to produce an output signal C having amplitudes at discrete points representing the corresponding position of the antenna.

Signals B are also applied to a generator 500 which produces output pulses D at the same frequency, the phase of these pulses being selected so that the occurrence of a pulse indicates the time that the modulated amplitude of signal C represents an antenna position. Thus effectively an antenna position is encoded as two signals available simultaneously, the first being a modulated periodic reference signal and the second being a trigger or marking signal at the same frequency having a phase position corresponding to discrete amplitude points representing the position of the antenna.

The modulated signals C may then be combined in a mixing circuit 600 to provide a composite signal for utilization in a combined azimuth-elevation indicating arrangement, such as is described in U.S. Patent No. 2,649,581 for "Single Scope Two Coordinate Radar System" by H. G. Tasker et al. issued August 18, 1953, also assigned to the present assignee.

The arrangement of Fig. 1 is merely illustrative of one application of the invention. Thus the encoding arrangement provided need not necessarily be utilized to represent the position of antennas or other rotatable devices but may represent the linear position of a device as well. Furthermore, it should be understood that the concept of encoding may be practiced with any number of operations being performed simultaneously, the mixing of two antenna encoding signals being merely illustrative.

The operation of the encoding arrangement of Fig. 1 is illustrated by considering the signal waveforms A, B, C and D which appear during a typical situation where the device (the azimuth antenna) moves through a positive angular position range and passes through a zero reference position into a negative position range.

Thus for this purpose azimuth antenna 400A is shown in three positions corresponding to (1) a maximum positive position; (2) a zero position oriented along a predetermined reference line; and (3) a maximum negative position.

Figure 1A:
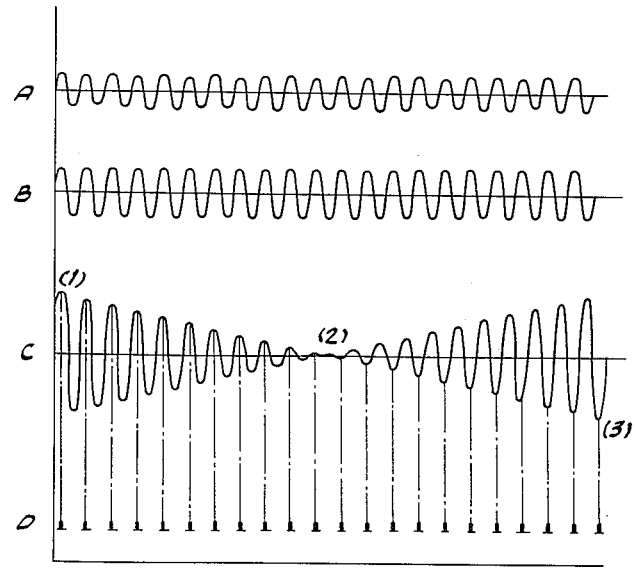
Fig. 1a is a composite set of waveforms occurring in the device of Fig. 1 during a typical operation.

The signal waveforms which occur during a typical operation are shown in Fig. 1a where the signal A of oscillator 100 is indicated to have the desired periodicity with slight variations in amplitude, and the reference signal B is indicated to have the same periodicity as signal A and an accurately regulated amplitude.

The signal C for the above-assumed situation has a relatively large modulated amplitude envelope when the azimuth antenna is in position (1), and trigger signals D then occur substantially in time coincidence with the positive peaks thereof. When the azimuth antenna is in the zero reference position, the modulated amplitude becomes substantially zero; and when the azimuth antenna is in the maximum negative position, the modulated waveform C again reaches a relatively large modulated amplitude but at this time it may be noted the trigger signals D coincide in time with the negative peaks of signals C.

Before considering a specific circuit arrangement which is suitable for practicing the encoding method of the invention, it is believed to be more important for the purpose of describing the basic and generic principles of the invention to consider the decoding method and basic means therefor shown in Fig. 3, an illustrative operation being depicted in the waveforms of Fig. 3a.

Referring now to Fig. 3, it is noted that the decoding means comprises an input and phase shift control circuit 600 which receives modulated signal C and produces corresponding output signals C′ which are properly positioned in reference phase with respect to trigger signals D applied to gate generator 700. One suitable form of circuit 600 is indicated generally in a block arrangement therein and includes a band pass filter 610 which is designed to separate out the fundamental periodic reference signal frequency and any sidebands therewith which carry the desired encoding position information. The filtered signals provided by circuit 610 are passed through an amplifier stage 620 to a phase shift circuit 630 which is operable to provide the necessary calibration ensuring the proper phase relationship between trigger signals D and the position representing amplitude points of modulated signal C. Signals shifted in phase in this manner through circuit 630 are applied to an output amplifier 640 providing the signal C′ mentioned above.

Gate generator 700 produces output signals G corresponding to applied trigger signals D having a pulse width specified in accordance with the time required to sample the discrete amplitude of signal C′ produced by circuit 600. Signals C′ and G then are applied to a sampling circuit 800 which preferably is of the type described in my copending application Serial No. 492,507, entitled "Fast Acting Bipolar Sampling Circuit," filed March 7, 1955. The general arrangement of this preferred sampling circuit is shown in Fig. 4 along with other suitable arrangements illustrating circuit 610, 620, 630, 640 and 700.

Sampling circuit 800 is operable to detect the instantaneous amplitude of modulated periodic reference signal C′ in response to each applied gating signal G and to produce an output signal E. Circuit 800 also includes a storage device which may be a capacitor, as indicated in Fig. 4 to be described, which retains each sampled signal during the period between gating signals G so that the output signal E varies in amplitude in accordance with the position of the device represented.

It will be noted that the signal E is shown as comprising a plurality of discrete steps corresponding to the plurality periods defined by signals G. However, in actual practice these steps may occur at such relatively high frequency with respect to the motion of the device represented that signal E appears to be a continuously varying signal. Thus in a typical application of the invention the repetitive rate of signals G may be in the order of 1500 cycles per second whereas the cycle rate of the device which is to have its position represented may be in the order of 1 cycle per second. In other words, signal E typically may include 1500 closely spaced steps for each cycle of an antenna movement. Furthermore, the stepped portion of signal E is readily filtered out through conventional low pass filter circuits, although this is not necessary.

In this manner then the position of a device such as a radar antenna may be accurately represented through the utilization of a modulated periodic reference signal where the amplitude of this modulated signal at certain discrete times during successive periods represents the position of the device. The encoding arrangement therefore provides two signals. The first is modulated in amplitude in accordance with the position of the device and the second indicates the particular amplitude points of the modulated signal for accurately representing this position. The decoding method of the invention then utilizes these two signals to reform a substantially continuously varying signal such as signal E shown in Fig. 3a, by adjusting the phase of the modulated reference signal, producing a gating signal G for each occurrence of a trigger or other marking signal, and detecting the amplitude of a modulated signal upon each occurrence of a gating signal to derive therefrom a substantially continuously variable signal representing the position of the device.

Figure 2:
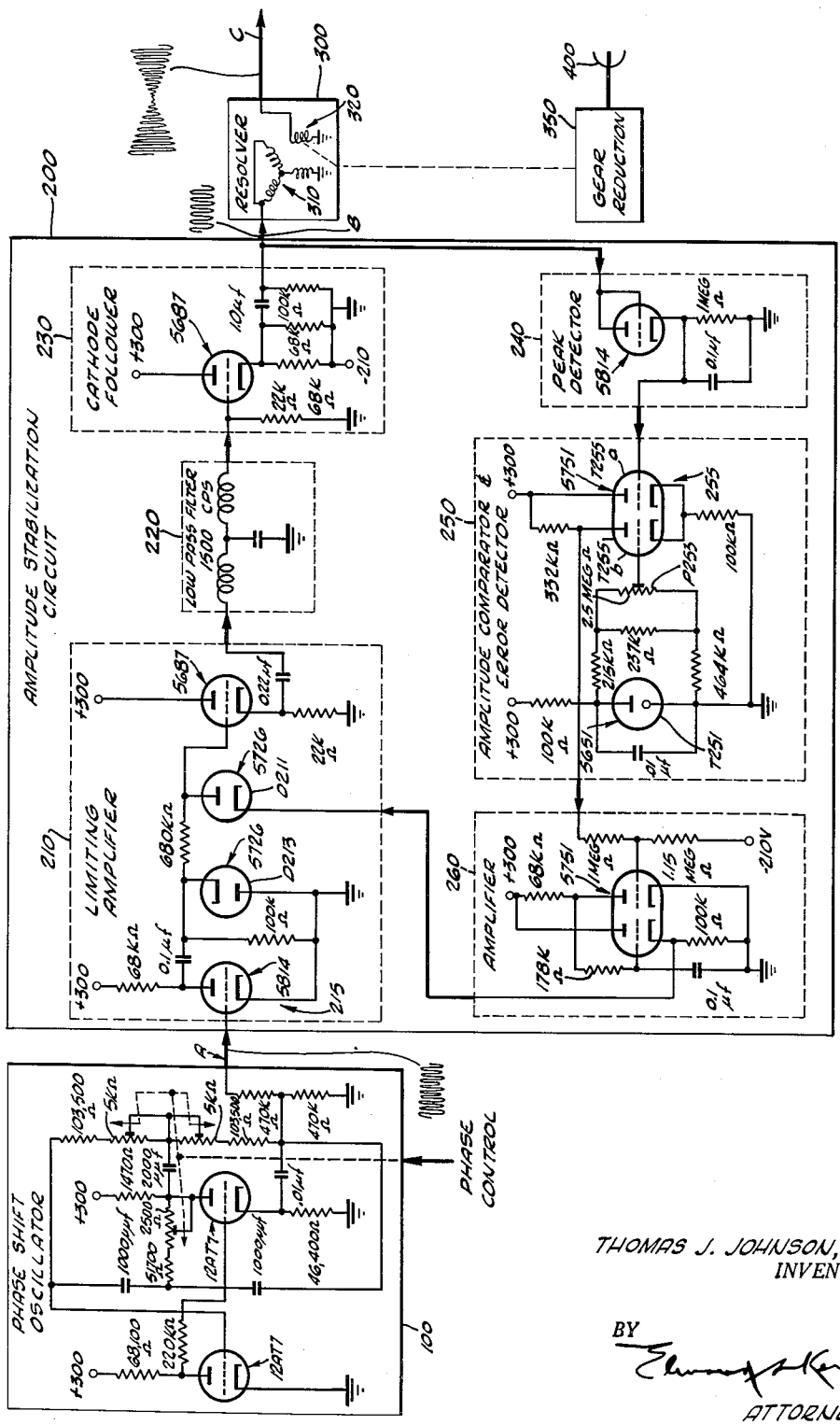
Fig. 2 is a schematic diagram of one specific form of the embodiment of Fig. 1.

A specific arrangement of encoding means according to the invention is shown in Fig. 2 where suitable circuit element values and types are indicated for practicing the invention. As indicated in Fig. 2 oscillator 100 may be a phase-shift type oscillator which is a conventional type now well known in the art. Therefore, it is deemed sufficient for this disclosure that reference be made to the schematic diagram therein as indicating a suitable mechanism for oscillator 100.

Signals A produced by oscillator 100 then are applied to amplitude stabilization circuit 200 indicated in a suitable arrangement to include a limiting amplifier 210 producing output signals which are passed through a low pass filter circuit 220 to the cathode follower circuit 230 and thence to a peak detector circuit 240. Essentially then the operation of circuits 210, 220, 230 and 240 is to derive a direct current signal from signal A having an amplitude representing the instantaneous modulation amplitude of signal A. This signal available at the output signal of a peak detector 240 is then compared to an accurate reference signal amplitude in an amplitude comparator and error detector circuit 250. Comparator and detector circuit 250 produces an output signal representing the difference between the reference amplitude desired and the actual amplitude detected in signal A. This difference signal is passed through an amplifier stage 260 to a clipping diode D211, in limiting amplifier circuit 210, diode D211 being operable to combine the unstabilized signal A with the detected error signal derived through amplifier stage 260 so that the resultant output signal B available at the output circuit of cathode follower 230 is stabilized in accordance with the reference signal amplitude introduced in comparison and detector 250.

While all of the specific circuit arrangements shown in Fig. 2 are conventional and therefore will not be described in considerable detail and suitable element values and types are indicated, it is helpful to point out certain components therein which are essential to the functioning of stabilization circuit 200. It will be understood, however, that while the arrangement of Fig. 2 is preferred in the practice of the invention, many other specific schematic arrangements may be utilized in this practice without departing from the spirit of the invention.

In addition to feedback diode D211, limiting amplifier 210 also includes a clamping diode D213 which prevents the amplified signal envelope derived through input amplifier stage 215 from falling below ground potential. This diode then provides one of the modulation amplitude boundaries required to accurately define a periodic reference signal B.

The other boundary is defined by voltage regulator tube T251 found in circuit 250 which provides the amplitude reference signal referred to above specifically derived through potentiometer P253 in circuit 250. This amplitude reference signal is compared to the output signal of peak detector 240 in a differential amplifier stage 255 having a first tube T255a which receives the peak detected signal of stage 240 and a second vacuum tube T255b which receives the reference amplitude signal. The operation of differential amplifier stage 255 is conventional and provides a difference representing output signal derived through the anode of tube T255b which is then amplified in stage 260 and constitutes the error correction signal utilized to modify the amplitude of signal A at its positive peaks to produce the accurately stabilized periodic reference signal B.

It will also be noted in Fig. 2 that the general schematic arrangement of resolver 300A is indicated, it being considered unnecessary to show both resolver means. In the arrangement shown in Fig. 2 the resolver is obtained by connecting the windings of a synchro so that two of the three windings are connected together to receive the signal B and the third winding receives a reference potential or is connected to ground as indicated. However, it will be understood that it may be desirable in some applications to utilize a resolver which is especially designed for this purpose.

The important function of resolver 300 to be noted is that there is an effective input winding 310 providing a vector signal which may be in the form of a flux vector which is linked to rotor 320 thereof so that as the rotor 320 is rotated due to its mechanical connection to antenna 400 the output signal produced thereby varies as a function sign of the angular displacement between rotor 320 and the resolver vector derived through input winding 310.

While for certain applications it may be desirable to utilize signal B throughout a complete sinusoid, it will be assumed for present purposes that only a partial rotation of rotor 320 is contemplated, the angle of rotation being limited sufficiently so that the sign thereof is substantially linear. Thus in this manner the angular position of antenna 400 may be fairly accurately represented by the amplitude level of signal E derived through the decoding circuit. The angle may be increased beyond the linear sinusoidal portion through the use of nonlinear mechanical couplings.

In this manner then a signal A of the desired frequency produced by oscillator 100 is converted into a signal B of the same frequency having an accurately stabilized amplitude through circuit 200. Signal B is then modulated through resolver 300 (which may comprise a synchro connected in an appropriate manner) resulting in a modulated sinusoidal envelope. As pointed out above, the gear reduction ratio of device 350 may be selected so that the signal conversion occurs in an appropriately linear range.

A suitable circuit arrangement for accomplishing the decoding method of the invention is illustrated in detail in Fig. 4. The particular circuits shown are conventional and therefore it is deemed sufficient to indicate appropriate values therefor without specifically describing the operation thereof. As indicated in Fig. 4, modulated signal C having amplitude values at discrete points which represent the instantaneous position of a device at the encoding end are received by a bandpass filter 610 in circuit 600. The amplitude points of signal C representing the position of the device are indicated by trigger signals D received by gate generator 700.

Filter 610 is designed to pass the frequency band encompassing the frequency of oscillator 100 as well as any sidebands carried therewith due to the encoded position information. The signals filtered in this manner then are applied to an amplifier 620 and thence to a phase-shifting circuit 630 which allows an adjustment of the phase position of amplified signal C so that its position-representing amplitude points are in a proper phase relationship with respect to received trigger signals D. These phase-adjusted signals then are applied to an output amplifier 640 producing signals C'.

Gating generator 700 essentially is a single stable state multivibrator which is triggered to one state resulting in a high level output signal G upon each receipt of a trigger signal D. Gate generator 700 then returns to a state where signal G has a relatively low level after a predetermined time interval specified by the circuit time constants therein. The time-width of signal G is selected so that signal C' may be sampled for a sufficient duration in time.

Signals C' and G then are applied to sampling circuit 800 which preferably is of the type more fully described in my copending application mentioned above. The principal function of sampling circuit 800 is to limit the amount of gating signal amplitude required in signal G to derive a sample from signal C', this sample being stored in circuit 800 in a capacitor (indicated therein to have a suitable value of 1000 microfarads). The output signal E produced by circuit 800 then corresponds to that shown in the waveforms of Fig. 3a.

From the foregoing description it should be apparent that the present invention provides a method and means for representing the variable position of a device where the position-representing signal is a periodic signal having amplitudes during predetermined times of respective periods corresponding to the instantaneous position of the device at that time; and/or a method and means for decoding a data signal of this type.

It has been pointed out that an important feature of the invention resides in the ability to represent positional data as the corresponding signal without the necessity of first translating such data into a corresponding voltage or other signal. It has also been pointed out that the method of the invention allows an accurate representation of the position of a device both in position and sign without the necessity of a complicated circuit arrangement.

While the invention is not necessarily so limited, it should now be apparent that the technique provided may be very useful where it is necessary to transfer position-representing signals to a remote location. This application is particularly useful in a radar system where antenna positional data must be remotely transmitted for utilization. In aspecific arrangement this antenna position information may be utilized in a ground-controlled approach arrangement to control the display of certain target information.

While the invention has been described with particular emphasis relating to the feature of sign encoding, it will be understood that the output signal may be considered by definition to represent the position of a device which is entirely positive or entirely negative. Thus the signal E which is derived through sampling circuit 800 shown in Fig. 3 need not be referenced to zero as indicating a center line in the angular scanning range of the device but rather may be referenced to other potentials so that the signal E is entirely positive or entirely negative, as the case may be.

It has also been pointed out that the invention need not necessarily be utilized to represent the linear motion of a device and that the motion itself need not be a rotating motion as is the case where an antenna position is represented.

Other modifications and variations in the utilization of the invention will be apparent to those skilled in the art.

What is claimed is:

1. A circuit for translating the variable position of a device into a signal representing this position, said circuit comprising: means for generating a standard periodic signal of predetermined fixed amplitude; resolver means including an input circuit and an output circuit, said input circuit being adapted to receive said standard signal and produce a corresponding flux vector signal presented to said output circuit; means coupling said output circuit to said device providing a rotation of said output circuit by predetermined amounts for any motion of said device; said output circuit thereby producing a signal corresponding to said flux vector signal sinusoidally modulated by an amount representing the position of said device; and pulse generating means responsive to said standard periodic signal for producing a pulse for each period of said periodic signal, the relative position of each pulse in the corresponding period being constant.

2. In a system wherein the instantaneous position of a device is represented by the amplitude of a modulated periodic standard signal, the particular times during successive periods that the standard signal amplitude represents the position of the device being indicated by pulses occurring at the periodicity of the standard signal; a decoding circuit comprising: phase adjustable means for receiving said modulated standard signal to produce a phase-adjusted standard signal having a phase relationship with said pulses selected to indicate the position of said device; means responsive to said pulses for producing, upon each occurrence of a pulse, a sampling gate signal; and means responsive to said phase-adjusted standard signal and said sampling gate signals for detecting the amplitude of said standard signal to produce thereby an output signal having an amplitude varying in accordance with the variation of the position of said device.

3. A method for translating the position of a device into a corresponding data signal, said method comprising: producing a periodic reference signal of predetermined fixed amplitude, converting said reference signal into a vector signal of predetermined direction; resolving said vector signal into a sine component in accordance with the motion of said device, the sine component being limited to relatively small angles, and producing a series of sampling signals during respective periods of said reference signal, each sampling signal having a phase relationship to the corresponding reference signal period indicating the points of the resolved vector signal which accurately represent the position of said device.

4. A method for decoding a data signal representing the position of a device, where the data signal is a modulated periodic signal having amplitudes at discrete points represented by sampling pulses occurring at the same periodicity as the periodic signal, said method comprising: adjusting the phase of the periodic signal with respect to the sampling pulses to ensure the proper correspondence between the position representing signal values of the periodic signal and the sampling pulses, producing a sampling gate signal for each occurrence of a sampling pulse, and detecting each instantaneous amplitude of the periodic signal upon the occurrence of a sampling pulse.

5. A system for encoding and decoding positional data comprising: first means for producing a modulated periodic signal having amplitudes at predetermined discrete points occurring at the same periodicity, each amplitude at a discrete point representing the position of the device at that time; second means for producing marking signals indicating the points of said periodic signal representing the position of said device; and third means for receiving said periodic signal and said marking signals and for deriving from said periodic signal an output signal having an amplitude continuously representing the position of said device.

6. The system defined in claim 5 wherein said system includes an antenna having a variable angular position, said first means including a resolver having an input circuit for receiving a periodic signal of fixed amplitude and an output circuit coupled to said antenna and rotatable therewith at a predetermined fractional rate thereof, said modulated periodic signal thereby representing at said discrete points the instantaneous angular position of said antenna.

7. The system defined in claim 5 wherein said third means includes a fast-acting bipolar sampling circuit having a first input circuit for receiving said modulated periodic signal and a second input circuit for receiving said sampling gate signal, said bipolar sampling circuit including means for limiting the amount of gating signal amplitude required to detect the instantaneous amplitude of said modulated periodic signal at said predetermined discrete points.

8. In a system for handling data representing the variable position of a device where the system includes means for producing a periodic synchronizing signal having predetermined amplitude; a circuit for producing a signal representing the position of said device comprising: resolver means including an output circuit rotatable at a predetermined fractional ratio with said device and an input circuit for receiving said periodic synchronizing signal, said input circuit being arranged to provide a flux signal vector of fixed direction, said output circuit having flux linkages with said input circuit whereby the rotation thereof results in the resolution of said synchronizing signal into a corresponding modulated synchronizing signal having amplitudes at predetermined points representing the position of said device; and means responsive to said synchronizing signals for producing trigger pulses indicating the time of occurrence of said points on said modulated synchronizing signal representing the position of said device.

9. In a system where the variable position of a device is represented by a modulated cyclic synchronizing signal having corresponding amplitudes at predetermined points, the occurrence of the points being indicated by trigger pulses occurring at predetermined points in the cycle of the synchronizing signal, a circuit for translating said modulated cyclic synchronizing signal into a varying amplitude output signal representing the position of the device, said circuit comprising: means responsive to the trigger pulses for producing sampling signals; and means receiving said cyclic modulated synchronizing signals and responsive to said sampling signals for deriving from said synchronizing signals a sampled amplitude thereof corresponding to the instantaneous amplitude in time coincidence with a corresponding sampling signal.

10. In a system where it is necessary to transfer information representing the angular position of an antenna to a remote station, the antenna receiving pulses of radio frequency energy with a relatively high periodicity, the improvement which resides in converting means coupled to said antenna for translating the angular position thereof into a modulated synchronizing signal having discrete amplitude points representing said angular position; means producing trigger signals at the frequency of said synchronizing signals in phase position corresponding to the points representing the antenna position; and means at the remote station for decoding said modulated synchronizing signal by sampling the instantaneous amplitude thereof upon each occurrence of a trigger signal.

11. A method for transferring angular positional data of a device to a remote location, said method comprising: generating a standard synchronizing signal of fixed amplitude; resolving said standard synchronizing signal into a modulated synchronizing signal in accordance with the angular position of the device; generating marking signals positioned in phase with respect to the synchronizing signal so as to coincide with points thereof representing the angular position of the device; and sampling said modulated synchronizing signal at the remote station in time coincidence with said marking signals to derive from said modulated synchronizing signals a varying output signal having an amplitude representing the position of said device.

12. In a system wherein it is desired to transmit information as to the angular position of an antenna beam to a remotely located point, the antenna beam constituting radio frequency pulses transmitted at a predetermined trigger signal rate, transforming means for representing said angular position in the form of a data signal said transforming means comprising: means producing a modulated synchronizing signal at a periodicity corresponding to the periodicity of occurrence of said trigger signals and having amplitude peaks occurring in time coincidence with said trigger signals corresponding to the instantaneous position of said antenna beam; first means at said remotely located point for deriving a sampling pulse from said trigger signals; and second means at said remotely located point for detecting the instantaneous amplitudes of said modulated synchronizing signal occurring at respective times.

13. The transforming means defined in claim 12 wherein said system includes two antennas respectively providing an azimuth beam and an elevation beam, each of said azimuth and elevation beams oscillating generally through the same space, said transferring means including resolver means coupled to said antennas respectively for providing respective modulated synchronizing signals; and means for combining said modulated synchronizing signals representing the positions of said azimuth and elevation beams to produce a composite data signal bearing information during respective time intervals of the positions of said antennas.

14. The means for transforming defined in claim 12 wherein said decoding means at the remote point includes a fast-acting bipolar sampling circuit having a first input circuit for receiving said modulated synchronizing signal and a second input circuit for receiving sampling signals, said bipolar sampling circuit including means for limiting the amount of sampling signal amplitude required to detect the instantaneous amplitude of said modulated synchronizing signal at said predetermined discrete points.

References Cited in the file of this patent

UNITED STATES PATENTS

| | | |
|---|---|---|
| 2,363,941 | Busignies | Nov. 28, 1944 |
| 2,407,282 | Johnson | Sept. 10, 1946 |
| 2,564,928 | Schmidt | Aug. 21, 1951 |
| 2,727,224 | Adkins | Dec. 13, 1955 |

FOREIGN PATENTS

| | | |
|---|---|---|
| 430,297 | Great Britain | June 17, 1935 |
| 433,360 | Great Britain | Aug. 13, 1935 |